United States Patent
Hohmann et al.

(10) Patent No.: US 12,255,525 B2
(45) Date of Patent: Mar. 18, 2025

(54) METHOD FOR ACTUATING A CIRCUIT ARRANGEMENT FOR POWER SEMICONDUCTORS

(71) Applicant: ZF Friedrichshafen AG, Friedrichshafen (DE)

(72) Inventors: Fabian Hohmann, Hofbieber (DE); Michael Meiler, Bayreuth (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 271 days.

(21) Appl. No.: 18/066,772

(22) Filed: Dec. 15, 2022

(65) Prior Publication Data
US 2023/0198375 A1 Jun. 22, 2023

(30) Foreign Application Priority Data
Dec. 16, 2021 (DE) .......................... 102021214531.0

(51) Int. Cl.
 *H02M 7/5387* (2007.01)
 *H02M 1/084* (2006.01)
 *H02M 1/088* (2006.01)
 *H02M 1/38* (2007.01)

(52) U.S. Cl.
CPC ........... *H02M 1/084* (2013.01); *H02M 1/088* (2013.01); *H02M 1/385* (2021.05)

(58) Field of Classification Search
CPC ...... H02M 1/084; H02M 1/088; H02M 1/385; H02M 1/32; H02M 1/0048; H02M 1/0041; H02M 1/08; H02M 7/537; H03K 17/687; H03K 17/567
See application file for complete search history.

(56) References Cited

U.S. PATENT DOCUMENTS

| | | | |
|---|---|---|---|
| 9,537,426 B2 | 1/2017 | Damson et al. | |
| 2014/0112039 A1* | 4/2014 | Correa Vasquez .... | H02M 7/487 363/98 |

FOREIGN PATENT DOCUMENTS

EP    3 195 475 B1    9/2019

OTHER PUBLICATIONS

German Office Action with Search Report in Corresponding German Application No. DE 10 2021 214 531.0, dated Dec. 21, 2022 (10 pages).

* cited by examiner

*Primary Examiner* — Muhammad S Islam
(74) *Attorney, Agent, or Firm* — Crowell & Moring LLP

(57) ABSTRACT

A method for actuating a circuit arrangement for power semiconductors of an inverter with at least one phase, having at least two semiconductor switches, each of which has at least two power semiconductors consisting of different semiconductor materials and connected in parallel with one another, wherein the method includes switching over between the at least two power semiconductors of different semiconductor materials within a clock period in each of the phases in each case at a first or last switching time of a switchover between the at least two semiconductor switches.

11 Claims, 2 Drawing Sheets

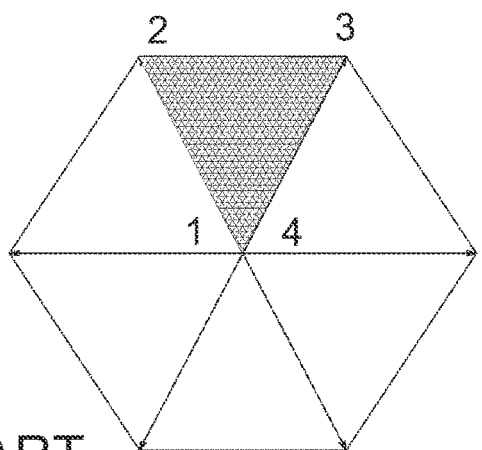
FIG. 1 - PRIOR ART
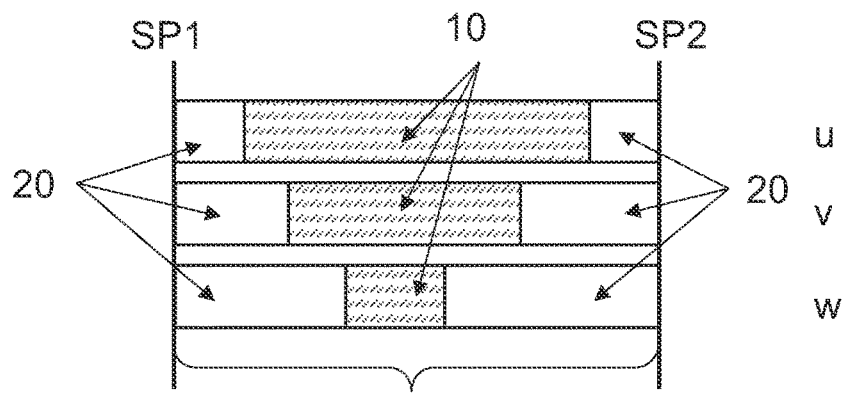
FIG. 2 - PRIOR ART
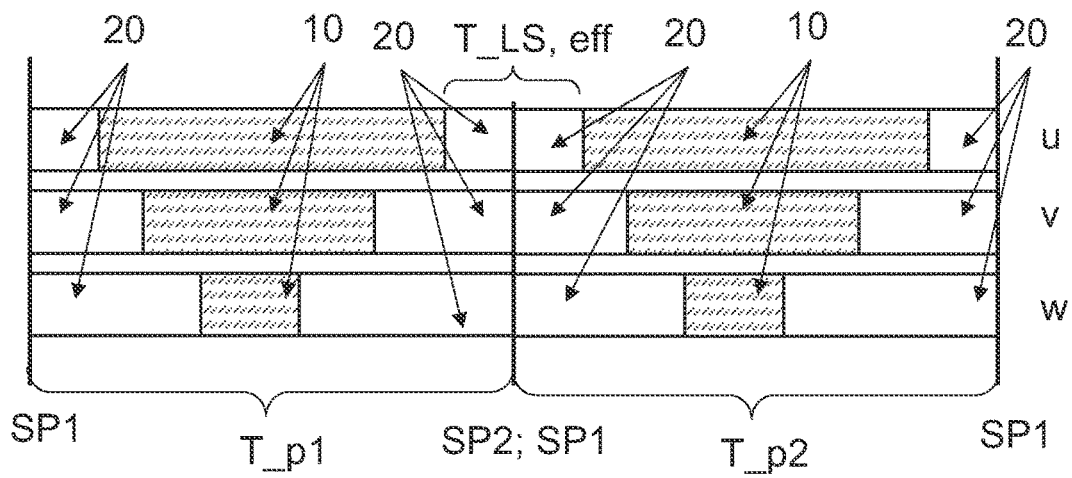
FIG. 3 - PRIOR ART

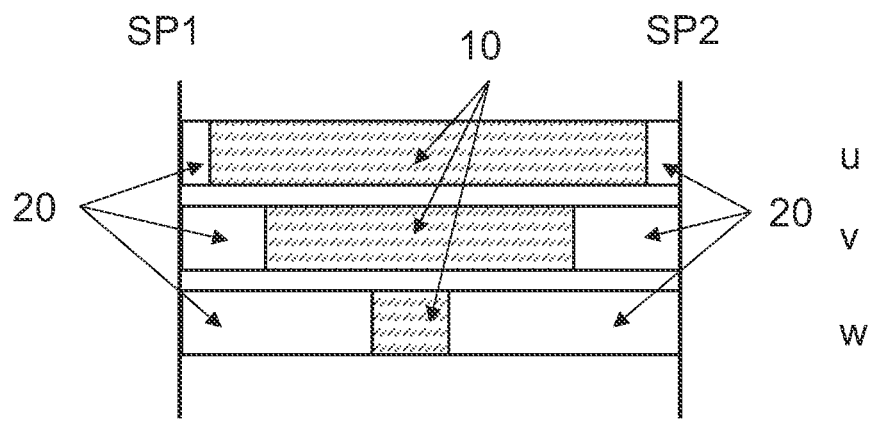
FIG. 4 - PRIOR ART
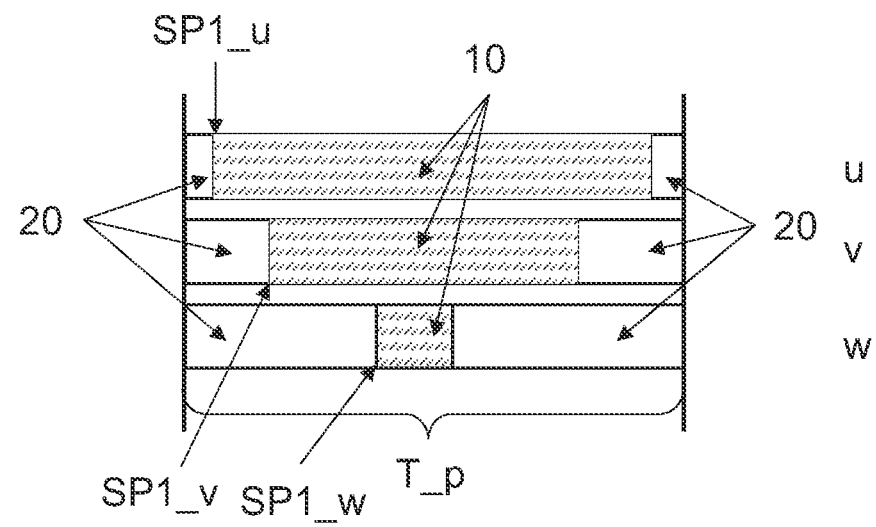
FIG. 5
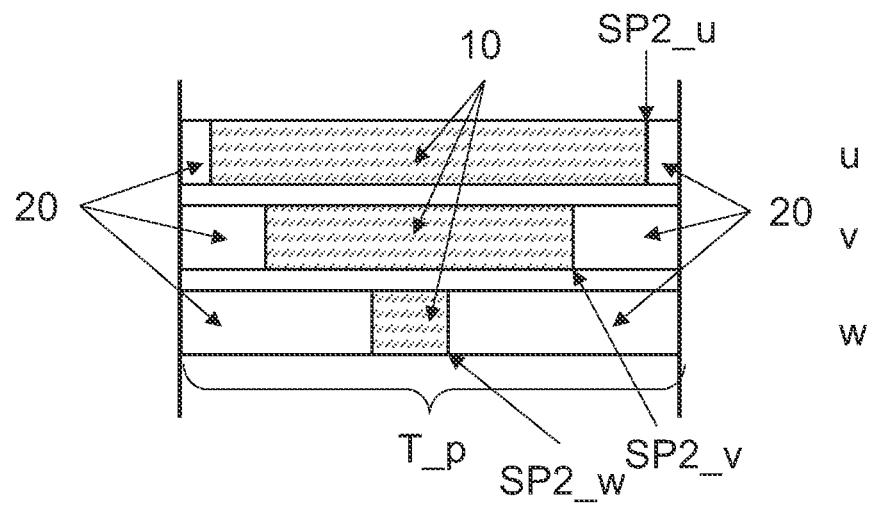
FIG. 6

METHOD FOR ACTUATING A CIRCUIT ARRANGEMENT FOR POWER SEMICONDUCTORS

CROSS-REFERENCE TO RELATED APPLICATION

This application claims priority from German Application No. DE 102021214531.0, filed on Dec. 16, 2021, the entirety of which is hereby fully incorporated by reference herein.

BACKGROUND AND SUMMARY

The present invention relates to the field of electric mobility, in particular of electronics modules for an electric drive.

The use of electronics modules, for example power electronics modules, in motor vehicles has significantly increased in the past decades. This can be attributed firstly to the need to improve fuel economy and vehicle power and secondly to the advances made in semiconductor technology. A main part of such an electronics module is an inverter, which serves the purpose of energizing electric machines such as electric motors or generators with a polyphase alternating current (AC). In this case, a direct current generated by means of a DC energy source, for example a battery, is converted into a polyphase alternating current. For this purpose, the inverters comprise a multiplicity of electronics component parts with which bridge circuits (for example half-bridges) are realized, for example semiconductor power switches, which are also referred to as power semiconductors.

A conventional method for increasing the power of inverters is that of connecting semiconductor switches which have power semiconductors consisting of different semiconductor materials, for example SiC-MOSFET and Si-IGBT, in parallel with one another. Within a period of a modulation method, in general four switching states are passed through. The possible switchover point from a power semiconductor consisting of a first semiconductor material to a power semiconductor consisting of a second semiconductor material or vice versa is at present always located at the end of a modulation period or at the start of the next. In the case of a fixed switchover at the end of the modulation period, therefore, very short pulses of the affected switch result primarily in the case of high modulation depths (i.e. long duty cycles). Short pulse times are critical primarily for silicon semiconductors, however, since they require a certain amount of time to reach a saturated state of their electron-hole plasma. If a disconnection of the component part takes place already previously, an undesired switching response of the component part can arise. Owing to the higher proportion of electrons in the total current, the component part can be switched off more quickly, which results in a higher overvoltage and can destroy the component part. In addition, chopping of the load current is possible, which likewise results in an overvoltage. In present silicon-based inverters, suppression of short pulses in the case of high modulation depths is therefore implemented. The additional switchover between two semiconductor materials intensifies the problem further.

Therefore, the invention is based on the object of providing an improved method for actuating a circuit arrangement for power semiconductors consisting of different semiconductor materials and connected in parallel, in which an optimum switchover time is provided in order to switch over from one switch consisting of one semiconductor material to another switch consisting of another semiconductor material.

This object is achieved by the features disclosed herein. Advantageous configurations are also disclosed herein.

What is proposed is a method for actuating a circuit arrangement for power semiconductors of an inverter with at least one phase, having two semiconductor switches, each of which has at least two power semiconductors consisting of a different semiconductor material and connected in parallel with one another. The method is characterized in that, within a clock period, a switchover between power semiconductors of different semiconductor materials takes place in each of the phases in each case at the first or last switching time of a switchover between the semiconductor switches.

By virtue of the individual switchover between different semiconductor materials at a time at which switchover from one semiconductor switch to the other semiconductor switch is taking place anyway, it is possible for switching operations to be saved. In addition, therefore, effective suppression of short pulses is possible even in the case of relatively high modulation depths.

In one embodiment, short-pulse suppression is provided depending on the modulation depth and the semiconductor material of the power semiconductor to which switchover is taking place. By virtue of short-pulse suppression, even higher modulation depths can be used.

In addition, a circuit arrangement is proposed which is part of an inverter of an electronics module for actuating the electric drive of a vehicle equipped with an electric drive and has at least two semiconductor switches, each of which has at least two power semiconductors consisting of a different semiconductor material and connected in parallel with one another. The circuit arrangement is in this case actuated in such a way that, within a clock period, a switchover between power semiconductors of different semiconductor materials takes place in each of the phases in each case at the first or last switching time of a switchover between the semiconductor switches.

In one embodiment, one of the semiconductor switches is a high-side switch and the other of the semiconductor switches is a low-side switch. In one embodiment, the first power semiconductor is in the form of a unipolar semiconductor component, and the second power semiconductor is in the form of a bipolar semiconductor component. In one embodiment, the semiconductor material of one of the power semiconductors is silicon carbide, and the semiconductor material of the other power semiconductor is silicon.

In addition, a control unit is proposed which is designed to implement the method.

In addition, an inverter, in particular a traction inverter, is proposed, having a circuit arrangement as described.

In addition, an electric drive of a vehicle is proposed, having an electronics module for actuating the electric drive, which has an inverter having a circuit arrangement as described. In one embodiment, the electric drive is in the form of an electric axle drive for a motor vehicle. In addition, a vehicle is proposed, having an electric drive as described.

Further features and advantages of the invention can be gleaned from the description below relating to exemplary embodiments of the invention, with reference to the figures in the drawings which show details according to the invention, and from the claims. The individual features can each be implemented individually or can be implemented with two or more combined in any desired combination in one variant of the invention.

Preferred embodiments of the invention will be explained in more detail below with reference to the attached drawings.

BRIEF DESCRIPTION OF THE DRAWINGS

FIG. 1 shows a transition diagram of switching states in the case of space vector modulation in accordance with the prior art.

FIG. 2 shows a schematic illustration of switching points within a clock period in accordance with the prior art.

FIG. 3 shows a schematic illustration of two successive space vectors in the same sextant in accordance with the prior art.

FIG. 4 shows a schematic illustration of switching states in the case of high modulation in accordance with the prior art.

FIG. 5 shows a schematic illustration of the switching points at the first switchover point in accordance with one embodiment of the present invention.

FIG. 6 shows a schematic illustration of the switching points at the second switchover point in accordance with one embodiment of the present invention.

DETAILED DESCRIPTION

In the descriptions of the figures below, identical elements or functions have been provided with the same reference symbols.

At present, circuit arrangements are already known for use in inverters which have semiconductor switches 10, 20 which have power semiconductors consisting of a different semiconductor material, i.e., for example, one power semiconductor consisting of silicon carbide, for example an SiC-MOSFET, and one consisting of silicon, for example an Si-IGBT. In general, the power semiconductors consisting of silicon carbide are unipolar component parts, and the power semiconductors consisting of silicon are bipolar component parts.

In the case of the inverter, four switching states are generally passed through within a clock period of a modulation method, as shown in FIG. 1 using the example of space vector modulation first from 1 to 4 and then back from 4 to 1 (1 and 4 are the zero-voltage space vectors). The possible switchover point SP1, SP2 from one semiconductor material to another semiconductor material or vice versa, i.e. from one power semiconductor to another power semiconductor, is at present always located at the end of a modulation period or at the start of the next, as shown in FIGS. 2 to 4. The reason for this is that, until now, an updated item of switching information can only be processed after all of the transitions (1 to 4 and back again) have been passed through completely.

If the electrical clock period T_p is plotted over time, the pulse pattern illustrated by way of example in FIG. 2 results. What is shown is three phases u, v, w, and, per phase u, v, w, two semiconductor switches 10, 20, of which one is a high-side switch 10 and one a low-side switch 20, each of which in turn has at least two power semiconductors consisting of a different semiconductor material and connected in parallel with one another. For example, one semiconductor material is silicon carbide SiC and the other is silicon Si. In addition, for example, one of the power semiconductors is a MOSFET, for example an SiC-MOSFET, and the other is an Si-IGBT.

The ratio of the area of the low-side switch 20 to the area of the high-side switch 10 results from the present modulation depth, which determines the duty cycle of the individual phases u, v, w. This modulation depth is proportional to the torque or phase current. Then, a new (electrical) clock period begins, in which, depending on the position of the motor, the same or an adjacent sextant of the transition diagram is passed through.

Since the modulation depth changes comparatively slowly, the duty cycle changes from clock period T_p1 to clock period T_p2 depending on the electrical frequency of the machine in order to modulate a sinusoidal current. When using the same pattern, the duty cycle of the low-side switch 20 therefore (in this example) doubles, as is shown in FIG. 3.

At present, the switchover from one power semiconductor to another power semiconductor, i.e. from one semiconductor material to the other semiconductor material, or vice versa, takes place at the end of a clock period T_p; T_p1, T_p2 (also referred to as clock cycle). As a result, this time in which the switch in question (in this case low-side switch 20) is active is not doubled. However, it is also possible here for an undesired short pulse to arise, depending on the modulation depth.

In the case of relatively high modulation depths, which result in relatively high duty cycles, the opposite switch (i.e. the high-side switch 10) increases its duty cycle, as is illustrated by way of example in FIG. 4. The switch-on time of the low-side switch 20 decreases drastically, however. In the case of fixed switchover at the end of the clock period T_p; T_p1, T_p2, very short pulses of the low-side switch 20 therefore result primarily in the case of high modulation depths, i.e. long duty cycles.

Short pulse times are critical primarily for silicon semiconductors since they require a certain amount of time to reach a saturated state of their electron-hole plasma. If a disconnection of the component part takes place already before the saturated state is reached, an undesired switching response of the component part can result. Owing to the relatively high proportion of electrons in the total current, the component part can be switched off more quickly, which results in a higher overvoltage and can destroy the component part. In addition, chopping of the load current is possible, which likewise results in an overvoltage. In present silicon-based inverters, therefore, suppression of short pulses in the case of high modulation depths is implemented. The additional switchover of the semiconductor materials intensifies the problem further still, however. Therefore, an aim of the present disclosure is to determine an optimum switchover time between the semiconductor materials.

In the present prior art, as shown in FIGS. 2 to 4, a switchover from one power semiconductor to another power semiconductor takes place in each case at the same switching point SP1 and/or SP2 at the start or at the end of a clock period T_p of the modulation method, which is generally pulse width modulation.

In order to address the abovementioned problems, in accordance with the present disclosure, actuation of a circuit arrangement takes place in such a way that the switchover no longer, as was previously the case, takes place at the same switching point SP1 or/and SP2 at the start or at the end of a clock period T_p of the modulation method. Therefore, a switchover between two different semiconductor materials can take place in each of the phases (in this embodiment three phases u, v, w are provided) independently of one another.

In each phase u, v, w, the switchover to the other semiconductor material now takes place at the first switching time SP1_u, Sp1_v, SP1_w in a clock period T_p (FIG. 5)

or at the last switching time SP2_u; SP2_v; SP2_w in a clock period T_p (FIG. 6) at which switchover is possible between high-side switch 10 and low-side switch 20 (or vice versa).

Since, during this switchover time, a dead time also needs to be implemented, using hardware, to protect the semiconductors from bridge short circuits, the change of semiconductor material is particularly sensible here. Thus, the traction inverter can ensure a stable operation without additional switchover operations. The change therefore takes place during the normal change to the complementary switch, i.e. from high-side switch 10 to low-side switch 20, or vice versa.

Before the conducting switch can be changed from the high side to the low side or from the low side to the high side, time is required in which both switches are switched off. This time is necessary since the semiconductor (the semiconductor component) requires a certain amount of time in order to change into the off state. This time is referred to as dead time and is dependent on the semiconductor used. Only after the dead time can the opposite switch be switched on again. During this dead time, the current is injected through the motor winding.

The proposed switchover strategy has the advantages that short pulses are effectively suppressed and that, during each switchover operation (apart from in the case of zero delay), one switch-on operation and one switch-off operation are saved, which results in fewer switching losses. In addition, a switchover of the three phases u, v, w now takes place independently of one another, i.e. the switchover takes place no longer (necessarily) as before at the same switching point SP1 and/or SP2 at the start or at the end of a clock period T_p of the modulation method.

In specific cases, in particular in the case of a switchover from silicon carbide to silicon, short-pulse suppression still needs to be implemented, depending on the modulation depth, in order to prevent damage to the component part. Short-pulse suppression is implemented, for example, by limiting the modulation depth.

In the examples shown in the figures, a clock period T_p; T_p1, T_p2 always begins with a low-side switch 20. However, it is also possible for a clock period T_p; T_p1, T_p2 to begin with a high-side switch 10. The basic concept remains unchanged thereby.

In the figures, in each case three phases u, v, w are illustrated, and the invention has been described with reference to the three phases u, v, w. However, the invention is not restricted to three phases u, v, w. It is also possible for only one, two or more than three phases u, v, w to be provided instead since the basic concept of the invention can also be applied to only one phase.

The power semiconductors can be unipolar component parts such as MOSFETs, JFETs, cascoden etc. but also bipolar component parts such as IGBTs. One semiconductor material is advantageously silicon, the other semiconductor material is advantageously silicon carbide, wherein other semiconductor materials suitable for the application can also be used.

By virtue of the proposed actuating method for a circuit arrangement used in an inverter, a high-efficiency inverter, which is used, for example, as drive inverter or traction inverter, can be achieved in which the switching losses during switchover from one active switch to another active switch (high side to low side or vice versa) are reduced. The circuit arrangement for which the method for actuating is proposed can be used in an inverter of an electronics module for actuating the electric drive of a vehicle equipped with an electric drive. It is also possible for electrified axles to be driven by the electric drive. The actuating method is advantageously operated via a control unit.

An electronics module within the scope of the present disclosure is used for operating an electric drive of a vehicle, in particular an electric vehicle and/or a hybrid vehicle, and/or electrified axles. The electronics module comprises an inverter. In addition, it can comprise a rectifier, a DC/DC converter, a transformer and/or another electrical converter or part of such a converter or a part thereof. In particular, the electronics module is used for energizing an electric machine, for example an electric motor and/or a generator. An inverter is preferably used for generating a polyphase alternating current from a direct current generated by means of a DC voltage of an energy source, for example a battery.

LIST OF REFERENCE SYMBOLS 1-4 switching states
10 semiconductor switch (high-side, HS)
20 semiconductor switch (low-side, LS)
u, v, w phase
SP1, SP2 switching point previously
SP1_u, SP2_u switching point phase u
SP1_v, SP2_v switching point phase v
SP1_w, SP2_w switching point phase w
T_p; T_p1; T_p2 electrical period

The invention claimed is:

1. A method for actuating a circuit arrangement for power semiconductors of an inverter with at least one phase having at least two semiconductor switches, each of which has at least two power semiconductors consisting of different semiconductor materials and connected in parallel with one another, wherein the method comprises:
   switching over between the at least two power semiconductors of different semiconductor materials within a clock period in each of the phases in each case at a first or last switching time of a switchover between the at least two semiconductor switches.

2. The method according to claim 1, further comprising:
   providing short-pulse suppression depending on a modulation depth and the semiconductor material of the power semiconductor to which the switchover is taking place.

3. A circuit arrangement for an inverter of an electronics module for actuating the electric drive of a vehicle, comprising:
   at least two semiconductor switches, each of which comprises at least a first power semiconductor and a second power semiconductor, wherein the first and second power semiconductors consist of different semiconductor materials and are connected in parallel with one another; and
   a controller configured to actuate the circuit arrangement, within a clock period, to perform a switchover between the first and second power semiconductors of the different semiconductor materials in each case at a first or last switching time of a switchover between the at least two semiconductor switches.

4. The circuit arrangement according to claim 3, wherein one of the at least two semiconductor switches is a high-side switch and the other of the at least two semiconductor switches is a low-side switch.

5. The circuit arrangement according to claim 3, wherein the first power semiconductor comprises a unipolar semiconductor component, and the second power semiconductor comprises a bipolar semiconductor component.

6. The circuit arrangement according to claim 3, wherein a semiconductor material of the first power semiconductor is silicon carbide, and a semiconductor material of the second power semiconductor is silicon.

7. A traction inverter comprising the circuit arrangement according to claim 3.

8. An electric drive of a vehicle comprising an electronics module for actuating the electric drive which further comprises the inverter according to claim 7.

9. The electric drive according to claim 8, wherein the electric drive is an electric axle drive for a motor vehicle.

10. A vehicle comprising an electric drive according to claim 8.

11. A control unit for an inverter configured to:
   actuate a circuit arrangement for power semiconductors of the inverter with at least one phase having at least two semiconductor switches, each of which has at least two power semiconductors consisting of different semiconductor materials and connected in parallel with one another; and
   switchover between the at least two power semiconductors of different semiconductor materials within a clock period in each of the phases in each case at a first or last switching time of a switchover between the at least two semiconductor switches.

* * * * *